April 14, 1970

J. T. SPENCER 3,505,975

COMBINED BIRD SHELTER AND FEEDER

Filed Feb. 24, 1969

INVENTOR.
JOSEPH T. SPENCER

BY

Learman, Learman & McCulloch

INVENTOR.
JOSEPH T. SPENCER

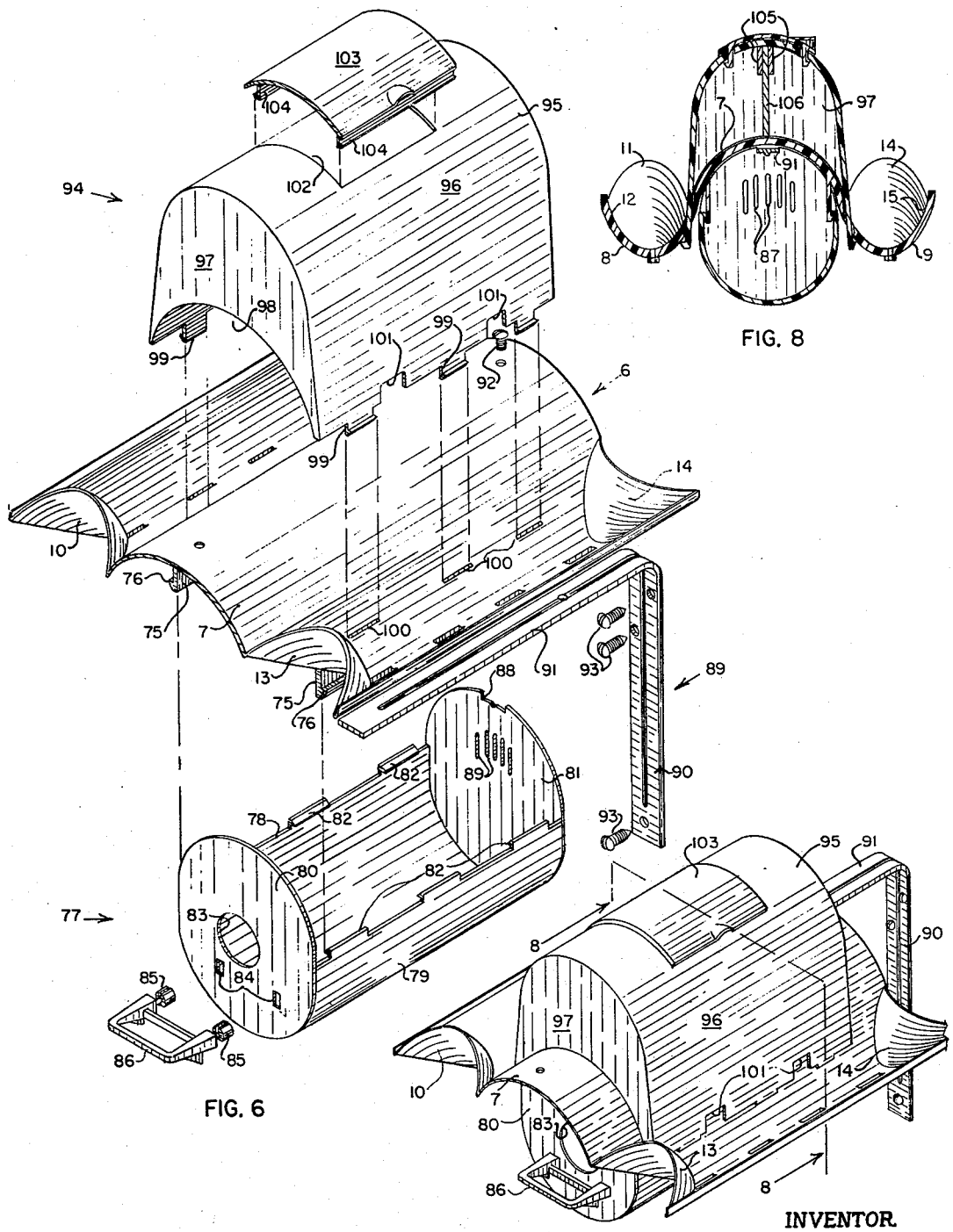

United States Patent Office 3,505,975
Patented Apr. 14, 1970

3,505,975
COMBINED BIRD SHELTER AND FEEDER

Joseph T. Spencer, Mount Morris, Mich.; Charles Nelson, Jr., 2515 S. Dye Road, Flint, Mich. 48504, administrator of said Joseph T. Spencer, deceased
Continuation-in-part of application Ser. No. 625,093, Mar. 22, 1967. This application Feb. 24, 1969, Ser. No. 805,985
Int. Cl. A01k 31/00
U.S. Cl. 119—23       18 Claims

ABSTRACT OF THE DISCLOSURE

A combined bird shelter and feeder having a hollow body forming a shelter, a canopy overlying the body and shaped to provide a food receptacle, and including anchor members removably securing the canopy to the body and simultaneously providing a perch. A food reservoir may be mounted atop the canopy to supply food automatically to the food receptacle.

---

This application is a continuation in part of application Ser. No. 625,093, filed Mar. 22, 1967, now abandoned.

The invention herein disclosed relates to a combined bird house and feeder construction and more particularly to a construction in which a shelter is provided by a hollow body which supports a canopy that is shaped to provide food and/or water receptacles, the body and canopy being removably maintained in assembled relation by anchor means which not only prevents inadvertent separation of the body and canopy, but if desired also provides a perch to facilitate ingress and egress to and from the shelter.

Many different forms of bird shelters or houses have been proposed heretofore and many different forms of bird feeders have been used. The materials from which such houses and feeders have been constructed are many and the shapes of such houses and feeders are countless. However, it does not appear that combined shelters and feeders have been proposed before, nor does it appear that it previously has been proposed to provide a shelter and feeder as separate components and removably join them together by anchoring devices which, in their operative positions, serve to provide interior, exterior, or both, perches to facilitate the movement of birds to and from the shelter. Neither does it appear that feeders heretofore have been usable selectively with or without a shelter or selectively with or without a food reservoir.

An object of this invention is to provide a bird shelter which is provided with its own food containing receptacle.

Another object of the invention is to provide a combined bird shelter and feeder wherein the feeder and shelter are separable from one another and usable independently of each other, but may be maintained in assembled relation by separable anchoring means which may provide one or more perches for birds.

Another object of the invention is to provide such apparatus which can be used with or without a food reservoir which delivers food automatically to the feeder and which provides for the delivery of more than one kind of food.

A further object of the invention is to provide apparatus of the character described which can be manufactured from inexpensive materials and, in many cases, from containers which otherwise would be discarded.

Other objects and advantages of the invention will be pointed out specifically or will become apparent from the following description when it is considered in conjunction with the appended claims and the accompanying drawings, in which:

FIGURE 6 is an exploded, perspective view of another embodiment;

FIGURE 7 is a perspective view, on a reduced scale, of the embodiment shown in FIGURE 6 in assembled relation; and FIGURE 8 is a transverse sectional view taken on the line 8—8 of FIGURE 7.

Figures 1, 2, 3:
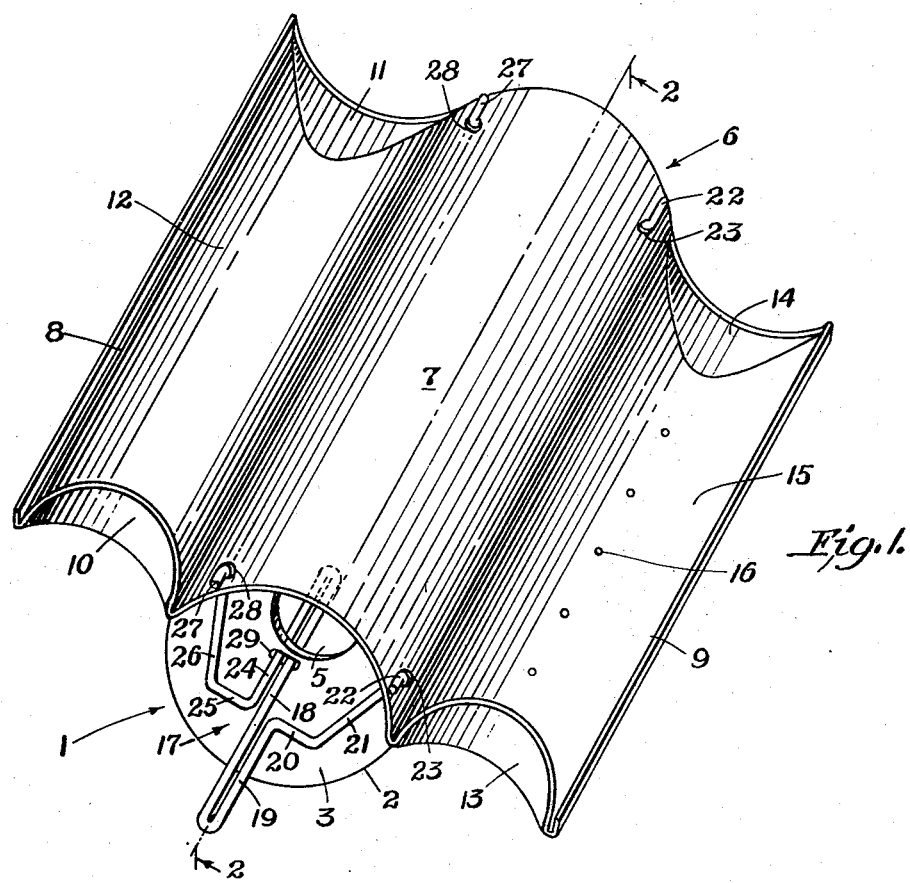
FIGURE 1 is a perspective view of a combined bird shelter and feeder constructed in accordance with one embodiment of the invention.
FIGURE 2 is a longitudinal sectional view taken on the line 2—2 of FIGURE 1.
FIGURE 3 is a fragmentary view similar to FIGURE 1, and illustrating another embodiment of the invention.

Apparatus constructed in accordance with the embodiment shown in FIGURES 1 and 2 comprises a shelter 1 composed of a hollow, generally cylindrical body 2 formed of synthetic material such as polyethylene and having walls 3 and 4 at its opposite ends. At least one of the end walls has an opening 5 therein through which a bird may enter and leave the body 2. If desired, however, both end walls may have an opening 5. Preferably, the access opening or openings are offset radially from the longitudinal center line of the body 2 for a purpose presently to be explained.

Adapted for use in conjunction with the body 1 is a canopy member 6 of generally sinusoidal or undulating configuration in cross-section and having a central section 7 which is rolled to conform substantially to the curvature of the body 2 so as to overlie and rest upon the latter. The central section 7, therefore, is convex upwardly. At one side of the central section 7 is a reversely curved, upwardly concave section 8. A similar, upwardly concave section 9 extends from the opposite side of the section 7. The opposite ends of the arcuate portion 8 are bent upwardly to provide end walls 10 and 11. A receptacle or trough 12 for food or water thus is formed, the trough taving a bottom, side and end walls, and an open top. The opposite ends of the arcuate member 9 also are upturned to form end walls 13 and 14, thereby providing a second and similar receptacle 15. Preferably, the lowermost part of the arcuate member 9 is provided with drainage openings 16.

As is best shown in FIGURE 2, the length of the canopy 6 is greater than the length of the body 2 so as to permit the canopy to overhang the opposite ends of the body. The overhanging ends of the canopy, coupled with the radially offset position of the openings 5, provide protection for the interior of the body against the entry of rain and snow.

Anchor means designated generally by the reference character 17 is provided at each end of the housing for removably maintaining the shelter 1 and the canopy 6 in assembled relation. The anchor means 17 is formed from a unitary piece of wire or the like having intermediate its ends an elongated, linear, rod-like portion 18 terminating at one end in a reversely turned portion 19 which parallels the portion 18 and, at about the middle of the latter, is laterally turned as at 20. Joined to the laterally turned portion 20 is an upward and laterally inclined arm 21 that terminates at its free end in a hook 22 which is removably accommodated in an opening 23 formed in the section 7 of the canopy 6. The opposite end of the rod portion 18 is reversely turned to form a parallel portion 24 which is laterally turned to provide a portion 25 from which extends an upward and laterally inclined arm 26 that also terminates in a hook 27 which is removably accommodated in an opening 28 formed in the arcuate section 7 of the canopy 6. An identical anchor device 17 is provided at the opposite end of the assembly.

Beneath the opening 5 each end wall 3 and 4 is provided with a slot 29 through which the parallel anchor portions 18 and 24 extend. The slots 29 are radially offset from the longitudincl center line of the body 2 so as to preclude relative rotation between the members 1 and 6. The anchor portions 18 and 24 also cooperate to prevent relative rotation of the members 1 and 6 inasmuch as the portions 18 and 24 are in the same plane and thus are nonrotatable relative to the body 2.

The length of the rod portion 18 may vary, but preferably it is of such length as to extend a sufficient distance inwardly and outwardly of the body 2 to provide interior and exterior perches so as to facilitate the movement of a bird into and out of the interior of the body.

The assembled shelter and feeder may be supported in any one of a number of different ways. For example, a cord (not shown) could be extended through the openings 23 and 28 and secured to a limb of a tree or to any other support.

The embodiment illustrated in FIGURE 3 is the same as that previously described except for the anchor means. The anchor means disclosed in FIGURE 3 is designated generally by the reference character 30 and comprises an elongated rod 31 formed of wood, for example, which extends through an opening 32 in each end wall of the body 2, the opening 32 being radially offset from the longitudinal center line of the body. The anchor device 30 also includes a tie element formed of a unitary piece of wire or the like having a loop 33 intermediate its ends which surrounds the rod 31. From the loop 33 extends a pair of upwardly diverging arms 34 and 35 which terminate in hooks 36 and 37, respectively, which are accommodated in the associated openings 28 and 23 in the canopy section 7. The length of the rod 31 preferably is such that it provides interior and exterior perches, and the radial offset of the opening 32 precludes relative rotation between the members 1 and 6.

Figure 4:
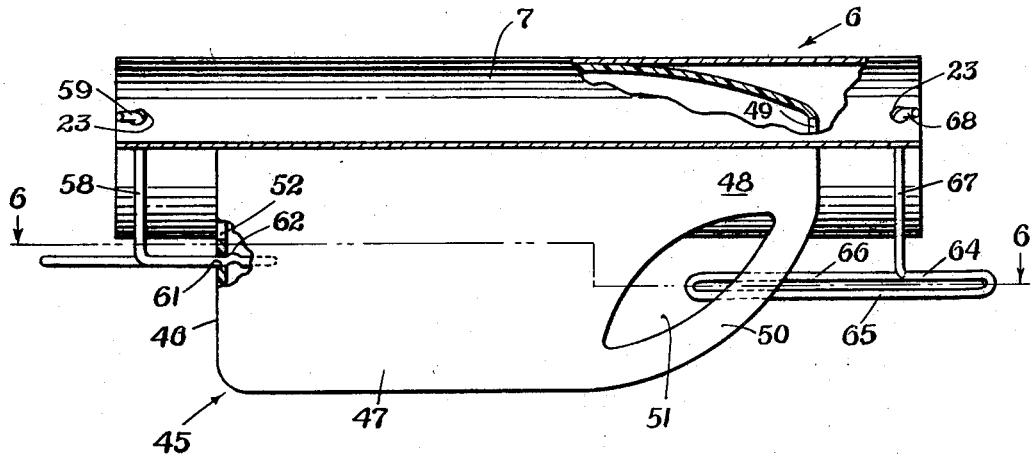
FIGURE 4 is a view partly in side elevation and partly in section of a modified form of the invention, with certain parts broken away for clarity.
Figure 5:
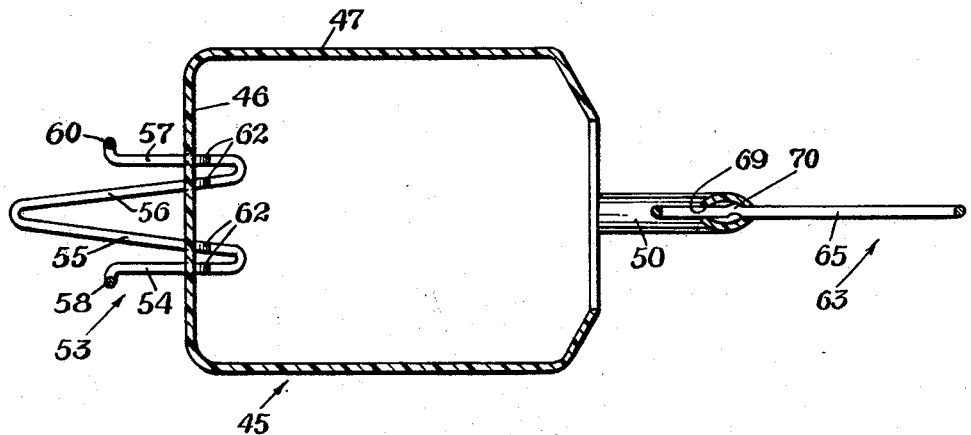
FIGURE 5 is a sectional view taken on the line 5—5 of FIGURE 4.

In the embodiment shown in FIGURES 4 and 5, the canopy 6 is identical to that disclosed is FIGURES 1, 2 and 3, but the housing and anchor devices are different. The housing is designated generally by the reference character 45 and comprises a hollow, plastic jug having a flat end wall 46 to which is joined one end of a cylindrical portion 47 that terminates at its opposite end in an inwardly flared, but radially offset spout portion 48 having an opening 49. As is conventional in jugs of this type, a tubular handle 50 joins the cylindrical portion 47 and the spout portion 48, the arrangement being such that an opening 51 is provided between the handle 50 and the spout 48. Preferably, the end wall 46 is provided with an opening 52 to permit access to the interior of the housing 45.

Adapted for removable connection to the end wall 46 is an anchor device 53 which preferably is formed of a single piece of wire the intermediate portion of which is shaped to form a plurality of coplanar, sinuous leg portions 54, 56 and 57. From the leg 54 extends an upwardly inclined arm 58 that terminates in a hook portion 59. From the leg 57 extends an upwardly inclined arm 60 which also terminates in a hook (not shown) similar to the hook 59. The hooks at the ends of the respective legs 58 and 60 are adapted to be accommodated in the openings 23 and 28 in the canopy section 7 in the same manner as previously has been described. The joined ends of the legs 54, 55 and 56, 57 are adapted to be accommodated removably in spaced apart openings 61 formed in the end wall 46 of the housing and located at a level radially offset from the longitudinal center line of the cylindrical portion 47. Preferably, each of the leg portions of the anchor device 56 is crimped as at 62 so that, when the members 45 and 53 are assembled, there will be no possibility of inadvertent withdrawal of the anchor member 53 from the housing 45. As is best indicated in FIGURE 5, the respective legs of the anchor device 53 project inwardly and outwardly of the housing wall 46 a distance sufficient to provide perches within and without the housing adjacent the openings 52.

At the opposite end of the body 45 is another anchor device 63 which comprises a single piece of wire or the like which, intermediate its ends, has three coplaner leg portions 64, 65 and 66. To the leg portion 64 is joined an upwardly inclined arm 67 which terminates at its free end in a hook 68 that is adapted to be accommodated in the opening 23 of the canopy 7. To the leg 66 is joined a similar arm (not shown) which also terminates at its free end in a hook similar to the hook 68. The leg portions 65 and 66 are adapted to be accommodated in an opening 69 formed in the handle 50, and each leg 65 and 66 is provided with a crimped section 70 to preclude inadvertent withdrawal of the legs from the opening in the handle. The opening 69 is located at a position offset from the longitudinal center line of the body 45.

As best shown in FIGURE 5, the several leg sections of the anchor device 53 lie in a horizontal plane, whereas the leg portions 65 and 66 of the anchor device 63 lie in a vertical plane. Moreover, the openings in the end wall 46 which accommodate the leg portions of the anchor device 53 are spaced on opposite sides of the longitudinal axis of the body member 45. Consequently, relative rotation between the canopy member 6 and the body member 45 is positively precluded.

In the embodiment shown in FIGURES 6, 7 and 8 the canopy 6 is the same as has been described previously except for the anchor means. The anchor means disclosed in this embodiment comprises a pair of parallel flanges 75 secured to and depending from the lower surface of the center section 7, but terminating short of the ends of the canopy. Each of the flanges 75 terminates at its free end in a laterally directed barb 76.

A shelter adapted for use with the canopy 6 is indicated by the reference character 77 and comprises a trough-shaped hollow body 78 having a generally semicircular wall 79 at the opposite ends of which are discs 80 and 81. The free edges of the wall 79 are provided with a plurality of laterally projecting tangs 82 which may be interfitted with the barbs 76 of the flange 75 so as to hold the canopy 6 and the shelter body 78 in assembled relation. The flanges 75 are sufficiently flexible to enable them to be deflected inwardly and thereby permit separation of the members 7 and 77 when desired.

The front disc 80 has an opening 83 therein to permit ingress and egress of birds to the interior of the body. The disc 80 may have additional openings 84 to accommodate the free ends 85 of a generally U-shaped perch number 86. The perch may be assembled with and disassembled from the body 78 by snapping the perch ends 85 into and out of the openings 84.

The rear disc 81 may be imperforate if desired, but it preferably is provided with a plurality of ventilating openings 87. The upper edge of the disc 81 preferably is provided with a notch 88 for a purpose presently to be explained.

The apparatus thus far described in connection with the embodiment of FIGURES 6–8 may be utilized as a combination bird feeder and shelter and may be mounted in any convenient manner. Preferably, however, the apparatus includes a mounting bracket 89 comprising a pair of right angular legs 90 and 91. The leg 91 may be inserted between the canopy section 7 and the body 77 by passing the leg 91 through the notch 88. The leg 91 may be secured to the canopy by means of a screw 92. The leg 90 may be secured to a post or other support by similar screws 92.

The embodiment shown in FIGURES 6–8 also includes a food reservoir 94 comprising an inverted, trough-like body 95 having a generally U-shaped wall 96 at the opposite ends of which are closure walls 97. The free edge of each wall 97 is curved as to correspond to the curvature of the canopy section 7. The free ends of the wall 96 are provided with barbed tangs 99 which are adapted to fit into openings 100 formed at the juncture of the canopy section 7 with the canopy sections 8 and 9. The tangs 99 are sufficiently flexible to enable the canopy 94 to be disassembled from the canopy 6 when desired.

Each edge of the reservoir wall 96 also is provided with a plurality of notches or recesses 101 to provide outlets which establish communication between the interior of the reservoir and the canopy portions 8 and 9 and thereby permit the contents of the reservoir to be delivered automatically to the canopy portions 8 and 9 as the demand requires.

The canopy may be provided with an opening 102 through which bird food and the like may be introduced to the reservoir when the latter is in place on the canopy 6. The opening 102 may be closed by a cover 103 having barbed flanges 104 similar to the flanges 75 and which cooperate with the adjacent edges of the opening 102 to maintain the cover in assembled relation with the body 95.

Each end wall 97 of the reservoir housing 95 preferably has a pair of spaced apart, parallel guide ribs 105 between which is removably accommodated a partition 106 that spans the length of the housing 95. When in place, the partition 106 rests atop the central portion 7 of the canopy 6 and divides the interior of the housing 95 into two compartments, thereby enabling two different kinds of food to be dispensed simultaneously from the housing 95.

Although the reservoir is shown as being associated with the embodiment of FIGURES 6–8 only, it will be understood that each of the other embodiments may be provided with the reservoir.

This disclosure is representative of presently preferred forms of the invention, but is intended to be illustrative rather than definitive thereof. The invention is defined in the claims.

I claim:

1. Animal feeding apparatus adapted for use with an animal shelter having a hollow body, said apparatus comprising a smoothly undulating canopy member having a pair of upwardly concave portions spaced apart by a central, upwardly convex portion, said central portion being adapted to embrace said body, each of said concave portions having its ends bent upwardly and toward the opposite end of said canopy member to form a trough on each side of said central portion in which food may be supported, said canopy member having means for securing said canopy member to said body.

2. Apparatus as set forth in claim 1 including a hollow reservoir atop said central portion and having openings therein in communication with said troughs.

3. Apparatus as set forth in claim 2 including partition means in said reservoir and dividing the latter into a plurality of compartments.

4. The apparatus set forth in claim 1 wherein said securing means comprises openings in said canopy member adapted for the accommodation of anchor means.

5. The apparatus set forth in claim 1 wherein said securing means comprises flanges carried by said canopy member and extending therefrom in a direction to engage said body.

6. Apparatus as set forth in claim 1 including a hollow body forming an animal shelter and accommodated in underlying relation to said central portion of said canopy member.

7. Apparatus as set forth in claim 6 wherein said body has at least one opening therein through which an animal may enter said body.

8. The apparatus set forth in claim 7 wherein said securing means includes an elongated portion extending in prolongation of said body member and externally of the latter below said opening to provide an external perch.

9. The apparatus set forth in claim 7 wherein said securing means includes an elongated portion extending in prolongation of said body member and internally of the latter below said opening to provide an internal perch.

10. The apparatus set forth in claim 7 wherein said securing means is secured to said body member at a point offset from the longitudinal center line of said body member.

11. The apparatus set forth in claim 10 wherein said securing means comprises a unitary structure bent intermediate its ends to form at least one leg portion extending into said body member and having arm means extending from said leg portion toward and in engagement with said canopy member.

12. The apparatus set forth in claim 11 wherein said securing means comprises a plurality of said leg portions spaced apart from one another.

13. The apparatus set forth in claim 7 wherein said securing means comprises an anchor device at each end of said body member, each of said devices having a plurality of coplanar leg members, and the leg members of each such device lying in different planes.

14. The apparatus set forth in claim 13 wherein the securing means at the opposite ends of said body member are vertically offset from the longitudinal center line of said body member.

15. The apparatus set forth in claim 14 wherein the securing means at one end of said body member includes a portion extending through one end wall in prolongation of said body member to provide a perch.

16. The apparatus set forth in claim 14 wherein the securing means at one end of said body member includes an elongated member extending through one end wall in prolongation of said body member, and a tie element comprising a pair of arms joined at corresponding ends to said elongated member and having hooks at their other ends in hooked engagement with said canopy.

17. The construction set forth in claim 14 wherein the securing means at one end of said body comprises a unitary rod-like element bent intermediate its ends to form an elongated portion extending through one end wall and a pair of arms extending from said elongated portion and terminating in hooks in hooked engagement with said canopy member.

18. The construction set forth in claim 6 wherein said securing means comprises interlocking barbs on said body and canopy members.

References Cited

UNITED STATES PATENTS

| D. 170,833 | 11/1953 | Rebora | D31—2 |
| 1,845,724 | 2/1932 | Sanguinet | 119—23 |
| 1,851,846 | 3/1932 | Kegler | 119—61 |
| 1,855,781 | 4/1932 | Tolley | 119—61 |
| 2,417,178 | 3/1947 | Ritter | 119—23 |
| 3,295,498 | 1/1967 | Brown | 119—23 |

HUGH R. CHAMBLEE, Primary Examiner

U.S. Cl. X.R.

119—51